United States Patent [19]

Holkestad

[11] 4,245,741
[45] Jan. 20, 1981

[54] ANTI-THEFT PACKAGING DEVICE

[76] Inventor: Howard P. Holkestad, Minnetonka, Minn.

[21] Appl. No.: 70,572

[22] Filed: Aug. 29, 1979

[51] Int. Cl.³ .................... B65D 1/36; B65D 6/04; B65D 85/67
[52] U.S. Cl. .................... 206/387; 206/565; 206/45.31; 220/22
[58] Field of Search .................... 206/387, 565, 45.31; 220/22

[56] References Cited

U.S. PATENT DOCUMENTS

| | | | |
|---|---|---|---|
| 3,675,763 | 7/1972 | Sandel | 206/387 |
| 3,776,374 | 12/1973 | Medendorp | 206/387 |
| 3,871,516 | 3/1975 | Holkestad et al. | 206/387 |

Primary Examiner—William T. Dixson, Jr.
Attorney, Agent, or Firm—Wicks & Nemer

[57] ABSTRACT

An anti-theft packaging device is disclosed, according to the teachings of the present invention, as including an enclosure having a generally open top face allowing insertion of the article to be packaged. The preferred enclosure then further includes an extension for extending the dimensions of the enclosure and thus of the article to be packaged. The article is held against removal in the enclosure by generally closed sides, ends, and bottom face and is held against movement or removal through the open top face by retention devices. Again, in the preferred embodiment, the retention devices are shown as a rib formed in the top face adjacent one side of the enclosure and has unidirectional hook shaped retention members located adjacent to the other side of the enclosure. The article can be inserted in the enclosure such that the leading edge of the article is placed under the rib and the trailing edge is forced past and under the unidirectional hook shaped retention members by nondestructibly distorting the enclosure. To assist in undestructibly distorting the enclosure, one of the retention members includes a lever arm for pivoting the retention member away from the enclosure.

15 Claims, 5 Drawing Figures

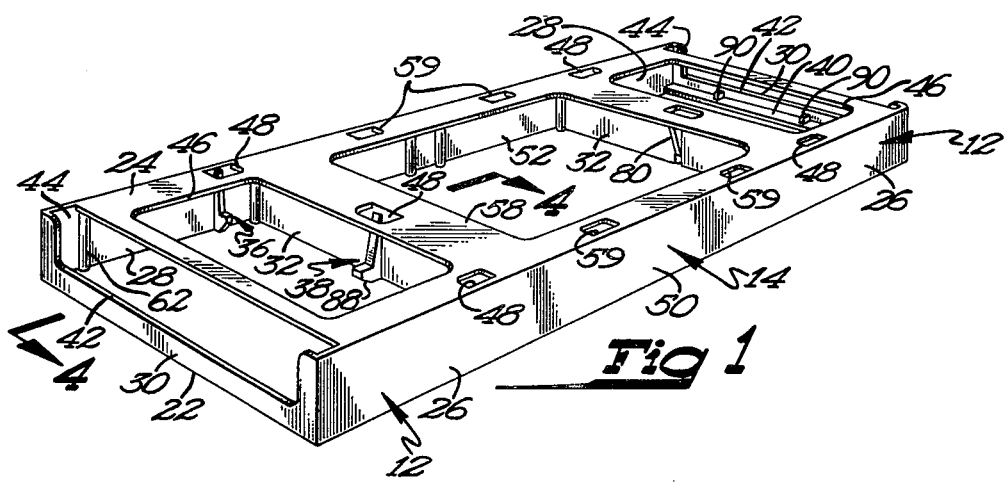
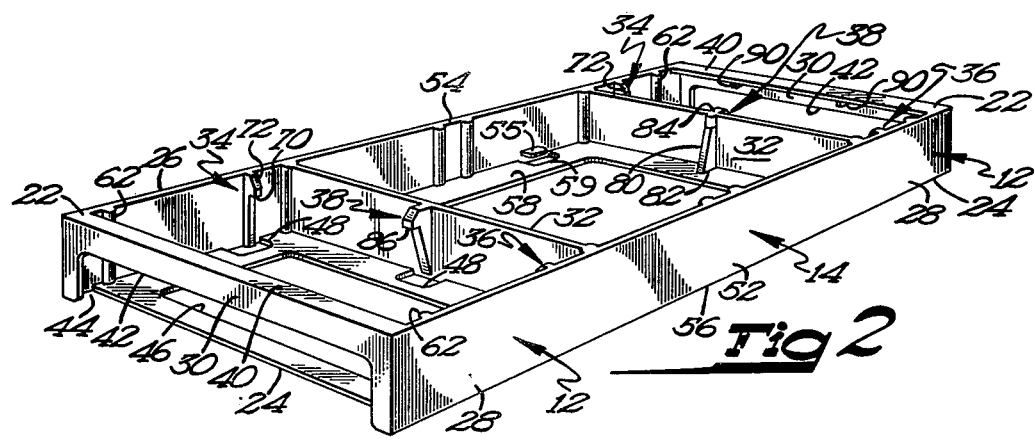
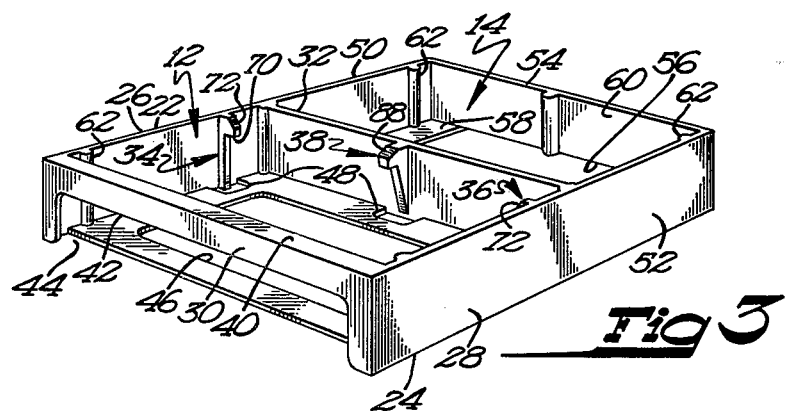
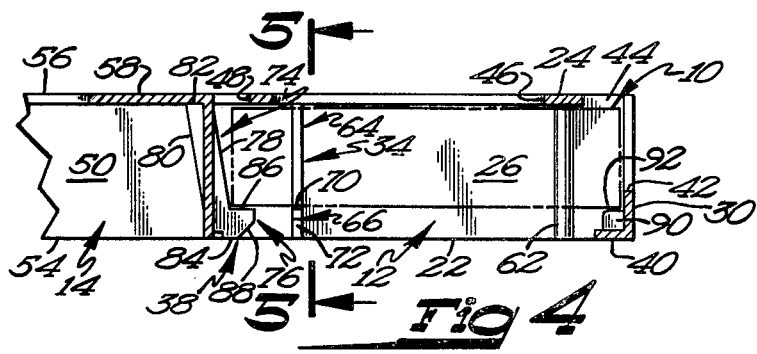
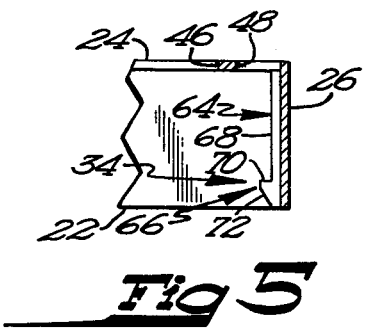

ANTI-THEFT PACKAGING DEVICE

BACKGROUND

The present invention relates generally to packaging devices and more specifically to anti-theft packaging devices for small, easily stolen articles.

With the increasing merchandising of small, easily stolen articles, an increasing need has arisen for methods and apparatus to prevent such theft. For example, cassette tapes have become quite a popular medium for the recording of music and the spoken word in general. Cassette tapes are generally of a small dimension, one popular tape case being approximately 4¾ inches in length, 2¾ inches in width, and approximately ⅝ of an inch in height. As can be easily recognized, a case of this size may be easily slipped into the pocket or purse of a thief or further concealed in packages or outer garments. Previous anti-theft packaging techniques have included a general approach of attempting to make the small article larger by excessively dimensioning the packaging in which the small article is inserted. Examples of previous anti-theft packaging techniques include those shown in U.S. Pat. Nos. 3,828,922 and 3,871,516 of the present inventor. These techniques make theft more difficult.

SUMMARY

The present invention provides an improved anti-theft packaging device, which, in the preferred embodiment, generally includes an enclosure having generally closed bottom, sides, and ends and a generally open top. The article is held in the enclosure by unidirectionally inserting the article through the open top and by nondestructibly distorting the enclosure. The device, in the preferred embodiment, further includes a member for extending the enclosure beyond the dimensions of the article.

It is thus an object of the present invention to provide a novel anti-theft packaging device.

It is a further object of the present invention to provide a novel anti-theft packaging device consisting of only one piece.

It is a further object of the present invention to provide a novel anti-theft packaging device which in its best mode must be destroyed to remove the article.

These and further objects and advantages of the present invention will become clearer in the light of the following detailed description of illustrative embodiments of this invention described in connection with the drawings.

DESCRIPTION OF THE DRAWINGS

The illustrative embodiments may best be described by reference to the accompanying drawings where:

FIG. 1 shows a bottom perspective view of an anti-theft packaging device according to the present invention.

FIG. 2 shows a top perspective view of the anti-theft packaging device of FIG. 1.

FIG. 3 shows a top perspective view of an alternate embodiment of the anti-theft packaging device of FIG. 1.

FIG. 4 shows a partial cross sectional view of the anti-theft packaging device of FIGS. 1 and 3 according to Section Lines 4—4 in FIG. 1.

FIG. 5 shows a partial cross sectional view of the anti-theft packaging device of FIGS. 1 and 3 according to Section Lines 5—5 in FIG. 4.

All figures are drawn for ease of explanation of the basic teachings of the present invention only; the extensions of the figures with respect to number, position, relationships, and dimensions of the parts to form preferred embodiments will be explained or will be obvious once the explanation is read and understood.

Where used in the various figures of the drawings, the same numerals designate the same or similar parts in the anti-theft packaging device. Furthermore, when the terms "first", "second", "top", "bottom", "end", "side", "left", "right", and similar terms are used herein, it should be understood that these terms have reference only to the structure shown in the drawings, as it would appear to a person viewing the drawings, and are utilized only to facilitate describing the invention.

DESCRIPTION

In the figures, an anti-theft device according to the teachings of the present invention for the packaging of small articles, designated 10, is shown in the form of an enclosure, designated 12, including an extension 14 extending therefrom to extend and enlarge enclosure 12 beyond the dimensions of article 10 to be packaged. Generally, a first preferred embodiment of the anti-theft packaging device of the present invention is shown in FIGS. 1 and 2 including first and second or right and left enclosures 12 and a second preferred embodiment of the anti-theft packaging device of the present invention is shown in FIG. 3 including only one such enclosure 12.

In particular, enclosure 12 comprises a hollow parallelepiped including two faces 22 and 24, two parallel ends 26 and 28 arranged perpendicular to and joining faces 22 and 24, and first and second sides 30 and 32 mutually perpendicular to and joining faces 22 and 24 and ends 26 and 28. Faces 22 and 24, ends 26 and 28, and sides 30 and 32 define the dimensions of enclosure 12.

Ends 26 and 28 and side 32 are solid in construction and thus are closed against removal of article 10 from enclosure 12 therethrough. First and second unidirectional hooks or retention members 34 and 36 are formed on the inside surfaces of ends 26 and 28, respectively, adjacent to side 32. A third unidirectional hook or retention member 38 is formed in side 32 at generally the midpoint of side 32.

Top face 22 is generally open but includes a rib or rectangular shaped bar member 40 located at the junction of face 22 and side 30. Rib 40 extends between ends 26 and 28 and joins side 30 to form a combined angular member.

Side 30 is generally solid in construction but includes a notched edge, designated 42, formed therein for purposes explained hereinafter. Although side 30 is provided with notched edge 42, side 30 is closed against removal of article 10 from enclosure 12 therethrough.

Bottom face 24 is also generally solid in construction but includes a gap, generally designated 44, of a size and shape generally corresponding to rib 40. Gap 44 is located at the junction of face 24 and side 30 and extends between ends 26 and 28. Gap 44 allows the injection molding of rib 40 and is utilized for other purposes explained hereinafter. Face 24 further includes an article viewing aperture 46. Injection apertures 48 may be provided in face 24 for allowing the injection molding of retention members 34, 36, and 38. Although face 24 includes gap 44 and apertures 46 and 48, face 24 is closed against removal of article 10 from enclosure 12 therethrough.

Extension 14 includes closed ends 50 and 52 formed by the continuation or extension of ends 26 and 28 past side 32, a generally open top face 54 which is an extension of face 22, and a generally open bottom face 56 which is an extension of face 24. Side 32 divides extension 14 from enclosure 12 and therefore is a common wall therebetween. Face 56 generally includes a border 58 formed at the junction of face 56 and ends 50 and 52 and side 32. First and second ledges 55 can be provided at the midpoints of ends 50 and 52, respectively, adjacent border 58. Injection apertures 59 may be provided in border 58 for allowing the injection molding of ledges 55.

In the first preferred embodiment of FIGS. 1 and 2, the anti-theft packaging device is shown as including right and left enclosures 12 and extensions 14 which are mirror images of each other. Specifically, ends 50 and 52 and border 58 of the right and left extensions 14 of the anti-theft packaging devices are connected together and contiguous. Thus, the anti-theft packaging device shown in FIGS. 1 and 2 is a single unit having the ability to hold two separate articles 10 in separate enclosures 12.

In the second preferred embodiment of the anti-theft packaging device shown in FIG. 3, a closed side 60 is arranged perpendicularly and joined to ends 50 and 52 and border 58. Thus, the anti-theft packaging device shown in FIG. 3 holds article 10 in a single enclosure 12. It should be noted that the device of FIG. 3 can be manufactured in a mold for molding the device of FIGS. 1 and 2 by simply putting a bar in the cavity between the right and left extensions thereof.

Ribs 62 can further be provided to reinforce the closed or solid portions of the anti-theft packaging device for aiding the closed portions of the anti-theft packaging device in resisting removable flexing. Ribs 62 are shown in the preferred embodiments formed in ends 26, 28, 50, and 52, and side 60.

As best seen in FIG. 5, retention members 34 and 36 are generally unidirectionally hook shaped and include a body portion 64 and a head portion 66. Body portion 64 is a bar member which outstands from ends 26 and 28 and includes a generally flat vertical abutting surface 68. Head portion 66 is generally an enlarged portion attached to body portion 64 and ends 26 and 28. Head portion 66 projects into enclosure 12 and includes an abutting surface 70 which is substantially parallel to and directed toward face 24 and extends from abutting surface 68 at a substantially right angle. An inclined surface 72 is formed on head portion 66 adjacent to and directed toward top face 22 for purposes to be explained further hereinafter.

As best seen in FIG. 4, retention member 38 is also generally unidirectionally hook shaped and includes a body portion 74 and a head portion 76. Body portion 74 has a shape of a parallelogram and is formed in and extends through side 32 such that the ends of the body portion 74 are located on opposite sides of side 32. Specifically, body portion 74 includes a first side 78, a second side 80, a first end 82, and a second end 84. End 82 is located outside of enclosure 12 and inside extension 14 and intersects and is attached to border 58 formed behind side 32. End 84 is located outside of extension 14 and inside enclosure 12 and intersects and is attached to head portion 76. Thus, side 78 extends from the intersection of face 24 and side 32 at an angle less than 90° and side 80 extends from the intersection of face 22 and side 32 at an obtuse angle. Head portion 76 projects into enclosure 12 and includes an abutting surface 86 which is substantially parallel to and directed toward face 24 and extends from side 78 of body portion 74 at an obtuse angle. An inclined surface 88 is formed on head portion 76 adjacent to and directed toward top face 22 for purposes to be explained further hereinafter.

As best seen in FIG. 4, spacers 90 are formed at the junction of side 30 and rib 40 and specifically within the combined angular member formed by side 30 and rib 40. Spacers 90 include an abutting surface 92 which is substantially parallel to and directed toward top face 24 and extends from side 30 at substantially a right angle.

As best seen in FIG. 4, the distance of surfaces 70, 86, and 92 from face 24 is substantially equal to the height of article 10 to be packaged. The distance between surfaces 68 of retention members 34 and 36 and between ribs 62 of ends 26 and 28 is substantially equal to the width of article 10 to be packaged. Likewise, the distance between end 30 and side 78 of retention member 38 is substantially equal to the length of article 10 to be packaged. Thus, the dimensions of article 10 to be packaged are approximately equal to the dimensions of enclosure 12.

Now that the structure of the anti-theft packaging device according to the teachings of the present invention has been set forth, the operation, advantages, and subtle features of the present invention can be explained and appreciated. To package article 10 in the anti-theft packaging device, the leading edge of article 10 is inserted into enclosure 12 through open face 22. The leading edge of article 10 is then inserted to abut end 30 below spacers 90 and the lower corner of leading edge of article 10 extends into gap 44 and the bottom surface of article 10 rests on the edge of gap 44 formed in face 24. The bottom surface adjacent the trailing edge of article 10 can be rested upon inclined surfaces 72 and 88 of retention members 34 and 36 and 38, respectively. The first and second side edges of article 10 are located adjacent and within ends 26 and 28, respectively, of enclosure 12.

At that time, one or both hands of the user may be placed such that the palms of the hands are located on article 10, with the thumbs placed pressing downward on border 58 adjacent retention member 38 and the forefingers placed around the sides 26 and 28 and pressing upward against face 24 adjacent member 38. Retention member 38 may then be pivoted back by pressing down on border 58 by the thumbs and by pressing up on face 24 by the forefingers. Simultaneously, the trailing edge of article 10 may be pressed into enclosure 12 by the palms of the hand nearest the thumbs. Inclined surfaces 72 and 88 of retention members 34, 36, and 38 act as camming surfaces such that when pressure is placed upon article 10, or in other words, article 10 is forced down on inclined surfaces 72 and 88, article 10 rides down on surfaces 72 and 88 thus nondestructively distorting and forcing ends 26 and 28 and side 32, respectively, outward. Thus, by the pivoting of retention member 38 and by the downward pressure on article 10, enclosure 12 can be nondestructively distorted until article 10 lies below and is captured by abutting surfaces 70, 86, and 92 hooking back over the top surface of article 10.

Article 10 then abuts against and is held from moving in a first direction by abutting surfaces 68 of retention members 34 and 36 and ribs 62 formed on ends 26 and 28, or in other words, generally by closed ends 26 and 28. Additionally, article 10 then abuts against and is held from moving in a second direction by side 78 of retention member 38 and side 30, or in other words, generally by closed sides 30 and 32. Furthermore, article 10 then abuts against and is held from moving in a third direction by abutting surfaces 70, 86, and 92 and closed face 24, or in other words, generally by closed face 24 and by retention devices which include spacers 90 formed on rib 40 and retention members 34, 36, and 38. Thus, article 10 is generally held against removal in enclosure 12 by generally closed sides 30 and 32, ends 26 and 28, and face 24. Further, the leading edge of article 10 is held by rib 40 and closed face 24 and the trailing edge of article 10 is held by retention members 34, 36, and 38 and closed face 24.

In addition to ribs 62, retention members 34, 36, and 38, border 58, the solid portions of face 24, and the junction of material between faces 22 and 24, ends 26 and 28, and sides 30 and 32 together provide strength to enclosure 12 to resist removal distortion or flexing thereof. Thus, due to the high strength and resistance to removal distortion or flexing of enclosure 12 and the close tolerance fit of article 10 in enclosure 12, it is almost impossible to nondestructively remove article 10 from enclosure 12 without the assistance of tools.

In the best mode of the present invention, to remove article 10 from enclosure 12, the user cuts or clips off head portions 66 and 76 of retention members 34, 36 and 38 with a suitable tool such as a wire cutter. After head portions 66 and 76 have been removed, article 10 can be pushed out of enclosure 12 through face 22 by pushing against article 10 by the fingers of the user through aperture 46 of face 24 of enclosure 12.

Thus, the basic use of the present invention in its preferred mode is a destructive use since after head portions 66 and 76 are removed from retention members 34, 36, and 38, the retention members 34, 36, and 38 are unable to prevent undesired removal of article 10 from exclosure 12.

It can then be appreciated that the retention devices, specifically retention members 34, 36, and 38, and particularly head portions 66 and 76 thereof, allow unidirection insertion of article 10 into enclosure 12 through face 22 by nondestructibly distorting enclosure 12 and retain article 10 within enclosure 12 preventing removal of article 10 from enclosure 12 without destruction of the anti-theft packaging device. Specifically, due to the hook shape of retention members 34, 36, and 38, retention members 34, 36, and 38 allow the unidirection insertion of article 10 into enclosure 12 but prevent removal of article 10 from enclosure 12 without destruction of the anti-theft packaging device due to retention members 34, 36, and 38 hooking back over article 10 in enclosure 12.

Gap 44 is then seen to assist in the insertion of article 10 into enclosure 12 because the bottom corner of the leading edge of article 10 may be located therein when article 10 is initially inserted into enclosure 12 and until article 10 is retained within enclosure 12 by retention members 34, 36, and 38.

In addition to adding strength to enclosure 12, body portion 74 and border 58 located adjacent to retention member 38 acts as a lever arm in distorting enclosure 12 and specifically in pivoting back retention member 38, and particularly head portion 76, out of enclosure 12 and thus allows article 10 to slip past head portion 76.

Further, due to this lever arm, head portion 76 of retention member 38 can be larger and thicker than head portion 66 of retention members 34 and 36, which do not include such a lever arm and yet allow insertion. This aids in preventing nondestructive removal of article 10 from enclosure 12.

Enclosure 12 must be formed from material which is nondestructibly distorable by retention members 34, 36, and 38. Specifically, enclosure 12 must be able to allow the unidirection insertion and retention of article 10 without permanent disfiguration or distortion. Further, enclosure 12 must be formed from material which is not removably flexible or distortable except by destruction. Specifically, enclosure 12 must resist distortion after article 10 has been unidirectionally inserted therein such that a thief cannot distort enclosure 12 sufficient to allow removal of article therefrom without destruction of the anti-theft packaging device. If a thief should so destroy enclosure 12 in an attempt to steal article 10, the sounds created in such destruction should alert security personnel in the area. In the preferred embodiment, the anti-theft packaging device is constructed as a single unit by injection molding styrene plastic.

Due to the preferred construction of enclosure 12, article 10 has a large visual exposure. For example, the title of a cassette which is located on the leading edge of article 10 can be viewed through notched edge 42, the cover or advertising portion located on the top surface of the cassette box can be viewed through open face 22, and the selections located on the bottom surface of the cassette box can be viewed through aperture 46 of face 24 of enclosure 12. Additionally, other advertising or similar material can be captured between ledges 55 and border 58 of extension 14 for viewing through faces 54 and 56 of extension 14.

The anti-theft packaging device of the embodiment of FIG. 3 can be sold with article 10 when the anti-theft packaging device is used in the preferred or destructive mode. The anti-theft packaging device of the embodiment of FIGS. 1 and 2 can be utilized in this manner if the total recording production includes two cassettes, with one cassette being located in the right enclosure 12 and the other cassette being located in the left enclosure 12. Furthermore, in the embodiment of FIGS. 1 and 2, one of the enclosures 12 can be utilized, for example, the right enclosure 12, and when the article is sold, the article can be removed therefrom and the anti-theft packaging device can be reused by inserting another article in the other enclosure 12 or the left enclosure 12. This use by the embodiment of the anti-theft packaging device of FIGS. 1 and 2 is preferred, because the size of the anti-theft packaging device is considerably greater than the embodiment of the anti-theft packaging device shown in FIG. 3, thus making the anti-theft packaging device of FIGS. 1 and 2 harder to conceal by a thief.

Now that the basic teachings of the present invention have been explained, many extensions and variations will be obvious to one having ordinary skill in the art. For example, although the anti-theft packaging device has been explained and is especially adaptable for the use with a cassette tape box, the anti-theft packaging device can be utilized with other small, easily stolen articles such as 8-track tape cartridges.

Thus, since the invention disclosed herein may be embodied in other specific forms without departing from the spirit or general characteristics thereof, some of which forms have indicated, the embodiments described herein are to be considered in all respects illustrative and nonrestrictive. The scope of the invention is indicated by the appended claims rather than by the foregoing description, and all changes which come within the meaning and range of equivalency of the claims are intended to be embraced therein.

What is claimed is:

1. Anti-theft device for packaging a cassette recording tape having a leading edge, a trailing edge, a first side edge, a second side edge, a top surface, and a bottom surface defining its dimensions, comprising, in combination: means for enclosing the cassette recording tape including a first generally closed side, a second generally closed side, a first generally closed end, a second generally closed end, a generally closed bottom, and a generally open top defining the dimensions of the enclosing means, with the dimensions of the cassette tape being approximately equal to the dimensions of the enclosing means; means attached to the enclosing means for extending the enclosing means to enlarge the enclosing means beyond the dimensions of the cassette tape for preventing easy concealment of the anti-theft packaging device by a perspective thief, with the enclosing means including a first closed end formed by the continuation of the first end of the enclosing means past the second side of the enclosing means, a second closed end formed by the continuation of the second end of the enclosing means past the second side of the enclosing means, and a border extending between the first and second closed ends of the extending means and attached to the second side of the enclosure; a gap formed in the bottom of the enclosing means at the junction of the bottom and the first side and extending between the first and second ends of the enclosing means for receiving the lower corner of the leading edge of the cassette tape inserted within the enclosing means through the top of the enclosing means; a rib formed in the top of the enclosing means at the junction of the top and the first side and extending between the first and second ends of the enclosing means for abutting with the leading edge of the cassette tape located within the enclosing means; a first retention member located on the first end of the enclosing means adjacent the second side of the enclosing means; a second retention member located on the second end of the enclosing means adjacent the second side of the enclosing means; a third retention member located on the second side of the enclosing means, with the first, second, and third retention members being hooked shaped and including a head portion allowing unidirection insertion of the cassette tape into the enclosing means through the open top of the enclosing means by nondestructibly distorting the enclosing means and for retaining the cassette tape within the enclosing means preventing removal of the cassette tape from the enclosing means without destruction of the anti-theft packaging device, with the head portion including an abutting surface spaced from the bottom of the enclosing means a distance substantially equal to the height of the cassette tape for abutting with the trailing edge of the cassette tape and further including an inclined camming surface for nondestructibly distorting the enclosing means when the trailing edge of the cassette tape is forced down on the camming surface, with the third retention member further including a lever arm for pivoting the third retention member and further distorting the enclosing means comprising a body portion having the shape of a parallelogram and including a first end located outside the enclosing means and attached to the border of the extending means and further including a second end located inside the enclosing means and attached to the head portion, and with the bottom, first and second sides, and first and second ends of the enclosing means being generally closed against removal of the cassette tape from the enclosing means and formed of material which allows insertion of the cassette tape into the enclosing means by placing the leading edge of the cassette tape below the rib of the top of the enclosing means and by nondestructibly distorting the enclosing means by forcing the cassette tape down on the inclined camming surfaces of the retention members and by pivoting the third retention member by the lever arm to allow the cassette tape to pass beyond the retention members and which does not allow removal of the cassette tape except by destruction of the anti-theft packaging device.

2. The anti-theft packaging device of claim 1 further comprising, in combination: an article viewing aperture formed in the bottom of the enclosing means; and an article viewing notch formed in the first side of the enclosing means, with the leading edge of the cassette tape including the title of the tape and being viewable through the notch of the first side of the enclosing means, with the bottom surface of the cassette tape including the selections of the tape and being viewable through the aperture of the bottom of the enclosing means, and with the top surface of the cassette tape including the cover of the tape and being viewable through the open top of the enclosing means.

3. Anti-theft device for packaging small articles comprising, in combination: an article having a leading edge, a trailing edge, a first side edge, and second side edge, a top surface, and a bottom surface defining its dimensions; means for enclosing the article, with the enclosing means including a first side, a second side, a first end, a second end, a top, and a bottom defining its dimensions, with the bottom, first and second sides, and first and second ends of the enclosing means being generally closed against removal of the article and with the top being generally open, with the dimensions of the article being approximately equal to the dimensions of the enclosing means; means attached to enclosing means for extending the enclosing means to enlarge the enclosing means beyond the dimensions of the article; and means for allowing unidirectional insertion of the article into the enclosing means through the open top of the enclosing means by nondestructibly distorting the enclosing means and for retaining the article within the enclosing means preventing removal of the article from the enclosing means without destruction of the anti-theft packaging device, with the unidirection insertion and retaining means comprising, in combination: means for retaining the leading edge of the article within the enclosing means; and means for retaining the trailing edge of the article within the enclosing means, with the bottom, first and second sides, and first and second ends of the enclosing means being removably inflexible except by destruction but nondestructibly distortable by the unidirectional insertion and retaining means.

4. The anti-theft packaging device of claim 3 wherein the trailing edge retaining means comprises, in combination: at least one hook shaped retention member comprising a head portion allowing unidirectional insertion of the article into the enclosing means through the open top of the enclosing means and including an abutting surface spaced from the bottom of the enclosing means a distance substantially equal to the height of the article for abutting with the trailing edge of the article.

5. The anti-theft packaging device of claim 4 wherein the head portion of the hook shaped retention member includes an inclined surface formed on the top thereof to act as a camming member for distorting the enclosing means when the article is unidirectionally inserted into the enclosing means by forcing the article down on and under the hook shaped retention member.

6. The anti-theft packaging device of claim 4 or 5 wherein the hook shaped retention member further includes a lever arm for pivoting the retention member out of the enclosing means and further nondestructibly distorting the enclosing means allowing the article to pass under the abutting surface of the hook shaped retention member.

7. The anti-theft packaging device of claim 6 wherein the lever arm comprises, in combination: a body portion extending from the head portion of the retention member at an obtuse angle and terminating in a relatively flat surface, with the flat surface allowing pushing by an appendage of the user's hand to thereby aid in pivoting the head portion of the hooked shape retention member.

8. The anti-theft packaging device of claim 7 wherein the body portion has the shape of a parallelogram and includes a first end located outside the enclosing means and attached to the flat surface and includes a second end located inside the enclosing means and attached to the head portion of the retention member.

9. The anti-theft packaging device of claim 7 wherein first, second, and third retention members are provided, with the first retention member located on the first end of the enclosing means adjacent the second side of the enclosing means, the second retention member located on the second end of the enclosing means adjacent the second side of the enclosing means, and the third retention member located on the second side of the enclosing means, and with the third retention member including the lever arm.

10. The anti-theft packaging device of claim 7 wherein the leading edge retaining means comprises, in combination: an elongated rib extending across the open top of the enclosing means, with the elongated rib being formed at the junction of the top and the first end of the enclosing means.

11. The anti-theft packaging device of claim 7 wherein the extending means comprises, in combination: a first closed end formed by the continuation of the first end of the enclosing means past the second side of the enclosing means; a second closed end formed by the continuation of the second end of the enclosing means past the second side of the enclosing means, and a border extending at least between the first and second closed ends of the extending means and attached to the second side of the enclosure.

12. The anti-theft packaging device of claim 11 wherein the relatively flat surface of the lever arm of the retention member is the border of the extending means.

13. The anti-theft packaging device of claim 3, 4, or 5 wherein the leading edge retaining means comprises, in combination: an elongated rib extending across the open top of the enclosing means, with the elongated rib being formed at the junction of the top and the first end of the enclosing means.

14. The anti-theft packaging device of claim 3 wherein the extending means comprises, in combination: a first closed end formed by the continuation of the first end of the enclosing means past the second side of the enclosing means; a second closed end formed by the continuation of the second end of the enclosing means past the second side of the enclosing means, and a border extending at least between the first and second closed ends of the extending means and attached to the second side of the enclosure.

15. The anti-theft packaging device of claim 3 further comprising, in combination: an article viewing aperture formed in the bottom of the enclosing means; and an article viewing notch formed in the first side of the enclosing means, with the leading edge of the article being viewable through the notch in the first side of the enclosing means, the top face of the article being viewable through the open top of the enclosing means, and the bottom face of the article being viewable through the aperture formed in the bottom of the enclosing means.

* * * * *